United States Patent [19]

McCabe

[11] Patent Number: 5,217,047
[45] Date of Patent: Jun. 8, 1993

[54] SOLENOID OPERATED PRESSURE REGULATING VALVE

[75] Inventor: Ralph P. McCabe, Troy, Mich.

[73] Assignee: Coltec Industries Inc., New York, N.Y.

[21] Appl. No.: 708,392

[22] Filed: May 30, 1991

[51] Int. Cl.$^5$ .......................................... F15B 13/043
[52] U.S. Cl. ............................. 137/625.61; 137/625.64; 251/129.18
[58] Field of Search ...................... 137/625.61, 625.64; 251/129.18

[56] References Cited

U.S. PATENT DOCUMENTS

| | | | |
|---|---|---|---|
| 2,267,515 | 12/1941 | Wilcox et al. | 137/625.65 |
| 2,625,136 | 1/1953 | Moog | 137/625.61 |
| 2,868,494 | 1/1959 | Kearns, Jr. et al. | 251/129.14 |
| 2,896,588 | 6/1959 | Hayner et al. | |
| 3,285,285 | 11/1966 | Bielefeld | 137/625.65 |
| 3,307,585 | 3/1967 | Schilling et al. | 137/625.27 |
| 3,349,801 | 10/1967 | Grundmann | 137/627.5 |
| 3,430,656 | 3/1969 | Hawk | 137/625.61 |
| 3,498,330 | 3/1970 | Paige | 251/129.21 |
| 3,521,854 | 7/1970 | Leiber et al. | |
| 3,529,620 | 9/1970 | Leiber | 281/129.18 |
| 3,651,833 | 3/1972 | Piko | 137/625.65 |
| 3,789,735 | 2/1974 | Tam et al. | 91/1 |
| 3,828,818 | 8/1974 | Hunt | 137/625.65 |
| 3,856,047 | 12/1974 | Takayama | 137/625.61 |
| 4,312,380 | 1/1982 | Leiber et al. | 137/625.65 |
| 4,320,781 | 3/1982 | Bouvet et al. | 137/625.65 |
| 4,338,966 | 7/1982 | Smith | 137/625.65 |
| 4,391,292 | 7/1983 | Millar | 137/596.17 |
| 4,507,707 | 3/1985 | Willis | 361/380 |
| 4,513,780 | 4/1985 | Evans | 137/625.65 |
| 4,522,371 | 6/1985 | Fox et al. | |
| 4,538,643 | 9/1985 | Goedecke | 137/625.64 |
| 4,556,085 | 12/1985 | Warrick | 137/625.65 |
| 4,567,910 | 2/1986 | Slavin et al. | 137/82 |
| 4,578,662 | 3/1986 | Slavin | 137/625.65 |
| 4,579,145 | 4/1986 | Leiber et al. | 137/625.65 |
| 4,610,267 | 9/1986 | Beck et al. | 137/596.17 |
| 4,655,249 | 4/1987 | Livet | 137/625.5 |
| 4,674,613 | 6/1987 | Sikorski | 192/52 |
| 4,678,006 | 7/1987 | Northman | 137/596.17 |
| 4,711,265 | 12/1987 | Davis et al. | 251/129.21 |
| 4,718,454 | 1/1988 | Appleby | 137/625.65 |
| 4,756,331 | 7/1988 | Stegmaier | 137/271 |
| 4,785,848 | 11/1988 | Leiber | 137/596.17 |
| 4,861,068 | 8/1989 | McCabe | 280/714 |
| 4,913,189 | 4/1990 | Kline et al. | 137/884 |
| 4,917,150 | 4/1990 | Koch et al. | 137/625.65 |
| 4,932,439 | 6/1990 | McAuliffe, Jr. | 137/625.65 |
| 4,966,195 | 10/1990 | McCabe | 137/625.61 |
| 4,998,559 | 3/1991 | McAuliffe, Jr. | 137/596.17 |
| 5,009,250 | 4/1991 | Kline et al. | 137/596.17 |
| 5,051,631 | 9/1991 | Anderson | 137/625.61 X |
| 5,060,695 | 10/1991 | McCabe | 137/625.61 |

FOREIGN PATENT DOCUMENTS

| | | | |
|---|---|---|---|
| 1157871 | 11/1963 | Fed. Rep. of Germany | 137/625.65 |
| 1100189 | 9/1955 | France | |
| 543767 | 5/1956 | Italy | 137/596.17 |
| 294989 | 4/1971 | U.S.S.R. | 137/625.65 |
| 316075 | 11/1971 | U.S.S.R. | 137/625.65 |
| 469852 | 8/1975 | U.S.S.R. | 137/596.17 |

Primary Examiner—Gerald A. Michalsky
Attorney, Agent, or Firm—Howard S. Reiter

[57] ABSTRACT

A pressure control device, preferably for use in a control system of an automatic transmission of a motor vehicle, is shown as having a solenoid motor assembly the armature of which, through a cooperating servo orifice, is effective for varying the magnitude of pressure of a fluid medium acting upon a spool slave-like valving member which ultimately provides a fluid medium to associated fluid medium receiving structure; a spring normally urges the armature toward the servo orifice and an adjustable spring seat is operatively engaged with the spring; the adjustable spring seat is formed of at least two pieces.

21 Claims, 2 Drawing Sheets

Fig 1

SOLENOID OPERATED PRESSURE REGULATING VALVE

FIELD OF THE INVENTION

This invention relates generally to pressure control devices for regulating the pressure of a fluid medium and employable, for example, in a control system of an automatic transmission of a motor vehicle.

BACKGROUND OF THE INVENTION

Heretofore the prior art has proposed various pressure control devices for use in a control system of an automatic transmission of an automotive vehicle.

Some of such pressure control devices comprise a fluid pressure positionable spool valve, the magnitude of the fluid pressure being determined by an armature and cooperating servo-like orifice or passage means. That is, in at least some of such pressure control devices, the more nearly the armature closes the servo-like orifice the greater becomes the magnitude of fluid pressure acting upon the spool valve to cause positioning thereof.

Further, in such prior art arrangements, it is not unusual to provide spring means for resiliently urging the armature means as toward the servo orifice means. This is usually done by having a generally axially extending spring seat member engaging one end of the spring means and being threadably engaged with surrounding structure as to thereby be axially movable, relative to the surrounding structure, to bring about an adjustment of the spring means as, for example, a preload thereof.

Such prior art pressure control devices did present problems in that concentricities of various surfaces had to be maintained to critical tolerances and such tolerances could not always be met or be what was desired from a manufacturing standpoint. The problem or problems of concentricity also occurred with respect to the spring seat member of the prior art.

The invention as herein disclosed and described is primarily directed to the solution of the foregoing as well as other related and attendant problems of the prior art.

SUMMARY OF THE INVENTION

According to one aspect of the invention, a pressure regulating assembly for regulating the pressure of a flowing fluid medium, comprises housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially confined between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, resilient means having first and second operative ends, wherein said first operative end is in operative engagement with said armature means, and spring seat means, wherein said second operative end is in operative engagement with said spring seat means, and wherein said spring seat means comprises at least two spring seat members.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENT

Figure 1:
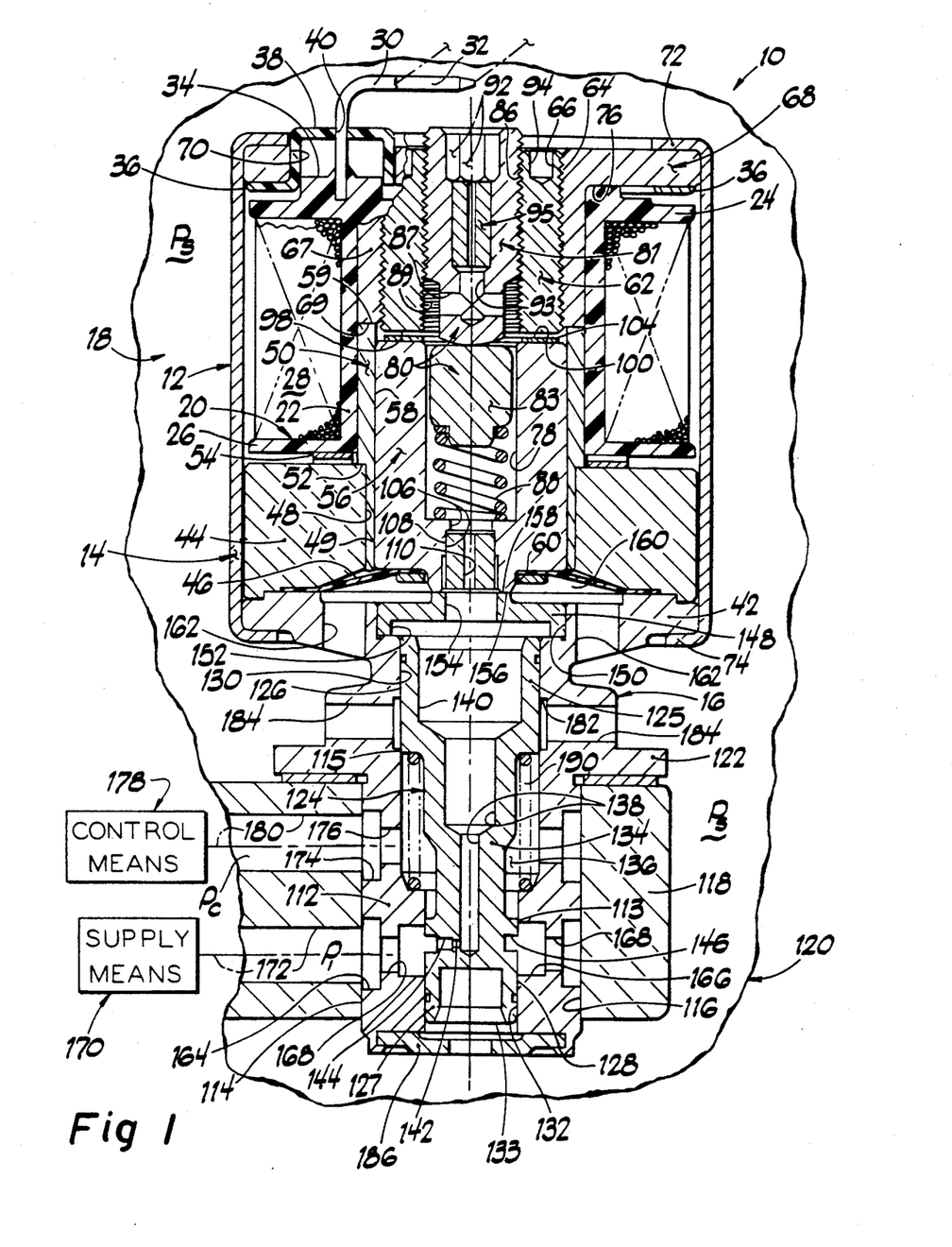
FIG. 1 is a generally axial cross-sectional view of a pressure regulating device employing teachings of the invention.

Referring in greater detail to FIG. 1 a pressure regulating apparatus or assembly 10 is illustrated as comprising housing means 12 which, in turn, is shown as comprising housing portions or sections 14 and 16.

Housing section 14 may be considered as containing, and comprising, electromagnetic motor means 18 which is illustrated as comprising a bobbin 20 having a generally tubular portion 22 with outwardly radiating axially spaced flange portions 24 and 26. An electrically energizable field coil 28, carried about tubular portion 22 and axially contained by and between flanges 24 and 26, has its conductor ends respectively connected to terminals or contacts 30 and 32.

The bobbin 20 is preferably formed of a dielectric plastic material and at its upper flange 24 provided with boss-like portions, one of which is typically shown at 34, which respectively receive and hold the terminals 30 and 32. In the embodiment shown such bosses are integrally formed with flange 24 in a manner as to be of the same radial distance but angularly spaced from each other.

A dielectric plastic ring-like member 36 has two inverted cup-like portions, one of which is typically shown at 38, which respectively receive the two boss-like portions. Each of the inverted cup-like portions is provided with a slot 40 for enabling the passage therethrough of the respective terminals 30 and 32.

An annular flange-like portion 42 of housing section or body 16 is received within and against the inner cylindrical surface of housing section or body 14. An annular or ring-like flux return member 44 is similarly received by housing body 14 and in axial abutment with flange 42 in a manner whereby a generally outer peripheral portion of a diaphragm 46 is sealingly retained therebetween. The flux return member 44 may be formed with an axially extending cylindrical passage 48 which closely receives an axially extending cylindrical portion 49 of cylindrical member 50. Cylindrical sleeve member 50 is shown provided with an annular abutment shoulder 52 for engaging an upwardly (as viewed in FIG. 1) directed annular abutment surface portion carried by flux return ring or member 44.

A ring-like or annular wave-type spring 54 is provided as to continually resiliently urge flux return member 44 and bobbin 20 in relatively opposite axial directions.

A cup-like cylindrical armature 56 is slidably received within an axially extending cylindrical inner surface or passage 58 of sleeve or cylindrical member 50. The lower end of armature 56 is provided as with an axially extending cylindrical portion 60, of relatively reduced diameter, which is depicted as receiving thereabout the inner peripheral portion of diaphragm 46 which is retained thereon as by a pressed-on retainer ring.

A generally tubular cylindrical pole piece 62, is provided with outer thread means 64 for threadable engagement with cooperating internal threads 66 of an upper annular or ring-like flux member 68. As typically depicted at 70, the flux member 68 is provided with clearance-like passages or openings for the reception therein of the inverted cup-like portions one of which is typically shown at 38.

As can be seen, when the opposite end portions 72 and 74 of housing body 14 are formed over axially outer surfaces of upper flux ring 68 and flange portion 42 of housing body 16, the inner annular shoulder or abutment surface portion 76 of upper flux ring 68 is urged against bobbin body 20 (in the direction of flange portion 42) while the flange 42, through lower flux ring 44 abutting against shoulder 52 of sleeve 50, urges sleeve 50 generally toward upper flux ring 68. In so doing the sleeve 50 and bobbin portion 22 are permitted to axially move with respect to each other until such is arrested by end 59 of sleeve 50 and end 69 of flux ring 68 abutting against each other. The annular wave spring 54 enables movement (during assembly) of bobbin means 20 toward flux ring 44 and when assembly is completed, wave spring 54 maintains bobbin means 20 in operative abutting engagement with upper flux ring 68.

In view of the above, it should now be apparent that the coacting and abutting ends 59 and 69 of sleeve or tubular cylindrical spacer 50 and tubular cylindrical extension 67 of flux member 68, respectively, as well as the annular shoulder 52, prevent the assembly, especially bobbin means 20 and field coil means 28 from becoming excessively axially compressed during assembly and forming-over of ends 72 and/or 74.

In one embodiment, the respective outer-most cylindrical diameters of extension 67 and spacer sleeve 50 were, each, defined as being 15.82/15.93 mm. while the inner cylindrical diameter of bobbin tubular portion 22 was specified as being 15.95/16.06 mm. thereby providing for a very close piloting of bobbin means 20 about both tubular extension 67 and spacer sleeve 50. In the preferred embodiment spacer or tubular member 50 is comprised of non-magnetic stainless steel.

FIG. 1 also illustrates spring seat means 80 whereby selected preloads upon spring means 88 can be applied.

Figure 2:
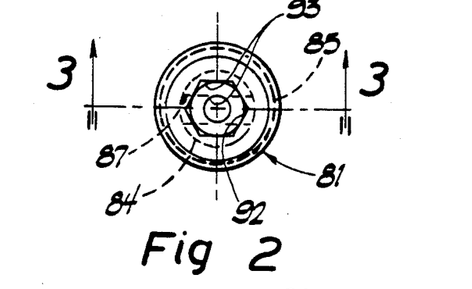
FIG. 2 is an end elevational view of one of the elements shown in FIG. 1.
Figure 3:
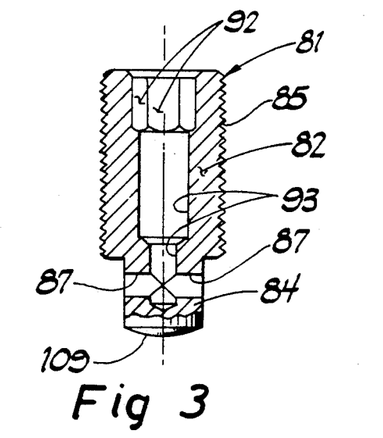
FIG. 3 is a cross-sectional view taken generally on the plane of line 3—3 of FIG. 2 and looking in the direction of the arrows.

The spring seat means 80 is illustrated as comprising spring seat body members 81 and 83. Referring also to FIGS. 2 and 3, spring seat body or adjustment member 81 is preferably comprised of body portions 82 and 84, each of which may be generally cylindrical, with body portion 82 having an outer thread 85 formed thereon for operative engagement with an inner thread 86 of generally tubular pole piece means 62. In the preferred embodiment, body portion 84 is provided with transverse passage or conduit means 87 which serves to communicate with the surrounding annular space 89 (FIG. 1) and axially extending passage or conduit means 93. In the preferred embodiment, conduit means 93 comprises suitable fluid flow restriction means 95 (FIG. 1). As can be seen, conduit means 87 communicates, through annular space 89, with a generally second annular space, between opposed end faces 98 and 100 of pole piece 62 and armature 56, respectively, which also contains an annular or ring-like spacer 104 preferably formed of non-magnetic material as, for example, half-hard brass.

The upper end of adjustment means 80 is provided with socket-like tool-engaging surface means 92, whereby member 81 may be threadably axially adjusted relative to pole piece 62, while the tool-engaging surface means for pole piece 62 may take the form of a plurality of recesses 94–94 in the upper axial end thereof as to enable the engagement therewith of a spanner wrench, or the like, for the threadable axial adjustment of pole piece 62 relative to flux path member 68 and depending portion 67 thereof.

Figure 6:
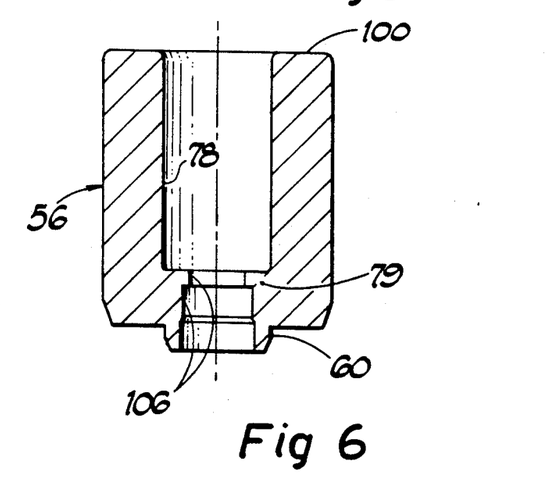
FIG. 6 is an axially extending cross-sectional view of still another element shown in FIG. 1.

The lower axial end 79 (as viewed in FIGS. 1 and 6) of armature means 56 has passage or conduit means 106 formed therethrough as to, generally, communicate, from an area axially outwardly of extension 60, to the passage or chamber means 78 of armature 56. As shown in FIG. 1, passage means 106 may be considered as comprising fluid flow restriction means 108 having suitable restrictive flow passage means 110. As best seen in FIG. 1, flow will occur into and through restrictive flow passage means 110, into generally cylindrical chamber 78, past adjustment member 83, into the space generally between pole piece 62 and armature 56, into annular space 89, into conduit means 93, which may comprise suitable flow restriction means 95, and through the space provided by socket 92 and to sump at $P_s$. It should be mentioned that the fluid thusly flowed also flows into available internally situated spaces and in so doing serves to purge therefrom any air as might be within the assembly 18. Also, such fluid flows into the space as between the outer cylindrical surface of armature 56 and the juxtaposed inner cylindrical surface 58 of sleeve or axial gauge member 50 thereby providing a lubricating quality as between the relatively movable surfaces.

Figure 4:
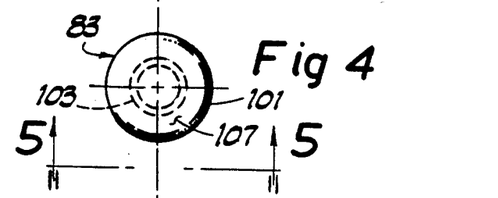
FIG. 4 is an end elevational view of another of the elements shown in FIG. 1.
Figure 5:
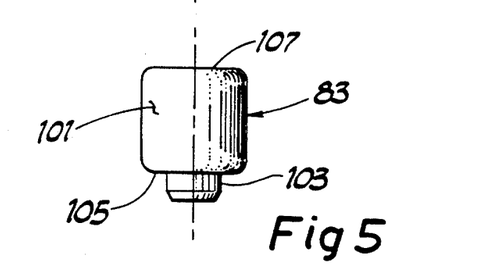
FIG. 5 is a view taken generally on the plane of line 5—5 of FIG. 4 and looking in the direction of the arrows.

Adjustment body member 83, also shown in FIGS. 4 and 5, comprises a generally cylindrical main body 101 which, at one end, carries a pilot-like extension 103 of relatively reduced cross-sectional dimension, thereby providing for one end of spring 88 to circumscribe pilot 103 and operatively engage an annular portion 105 of main body 101. In the preferred embodiment, the opposite axial end 107 of main body 101 is a substantially flat surface. In comparison, referring also to FIGS. 1, 2 and 3, the operatively juxtaposed end 109 of adjustment member 81 is preferably formed as to comprise a portion of spherical configuration. Therefore, when body members 81 and 83 (comprising adjustment means 80) are brought into operative engagement with each other, as shown in FIG. 1, the generally rounded surface 109 will abut against surface 107 and cause the push member or force transmitting member 83 to compress or relax the spring 88 in accordance with selective threadable rotation of body member 81 relative to pole piece means 62. It has been discovered that by forming the juxtaposed surfaces 109 and 107, as disclosed, the force transfer member 83 does not become deleteriously cocked within and against the surface of chamber 78 and critical concentricity dimensions are no longer required as between and/or among, for example, chamber 78, juxtaposed outer surface of main body 101 and member 81. If the adjustment means 80 were a single member comprised of members 81 and 83 in a unitized configuration, such problems of concentricity would exist. Further, it has been discovered that the configuration of surfaces 107 and 109 (FIGS. 3 and 5) may not be reversed and still obtain proper action by body member 83. That is, if surface 109 were to be made flat and surface 107 were to be made curved, member 83 would become unacceptably cocked or skewed within chamber 78 and cause interference to the proper operation of armature 56. By having the surfaces 107 and 109 as disclosed, the curved surface 109 in effect presents a point-like contact against surface 107 and the force, transmitted by such point-like contact, is applied to the push member 83 at an area not radially outward of the coiled centerline of spring 88.

Housing section or portion 16 is illustrated as comprising a housing body 112, of which flange portion 42 preferably comprises an integral portion, having an outer cylindrical surface 114 operatively received as in an inner cylindrical surface 116 of associated support structure 118 carried as by an automotive power transmission means 120. As illustrated, the body 112, of non-magnetic material, may have suitable flange means 122 by which the body 112 can be suitably secured to structure 118.

A spool valve member 124, preferably of aluminum alloy, having axially spaced first and second generally tubular valve portions 125 and 127 with outer cylindrical surfaces 126 and 128 respectively carried thereby, is slidably received within a cooperating passage comprising at least a first axially extending cylindrical surface 130 and a second relatively smaller axially extending cylindrical surface 132 which may be considered as being in communication with each other. As shown, valve body portion 125 is closely slidably received within passage portion 130 while valve body portion 127 is closely slidably received within passage portion 132.

Valve body portions 125 and 127 are joined to each other by an axially extending intermediate body portion 134. Preferably, body portion 134 has a cylindrical outer surface of generally reduced diameter, or diameters, thereby forming, in combination with passages 130 and 132, annular chamber or passage means 136. Spool valve member 124 is provided with axially extending passage or conduit means 138 effectively communicating with a recess or cavity 140, formed axially into valve body portion 125, and a calibrated flow restriction 142 which communicates, as through a conduit portion 144, with an annular circumferentially formed recess or groove 146.

A generally cylindrical valve seat or poppet valve seat member 148, preferably of non-magnetic stainless steel, is sealingly pressed into a recess 150 in valve housing or body 112. In the embodiment shown, a chamber 152 is formed as to be axially of valve body portion 125 and larger in diameter than the outer cylindrical surface 126 of valve body portion 125. A passage or aperture 154, generally centrally formed through valve seat member 148, communicates with chamber or cavity 152 and cavity 140. When the apparatus 10 is in a condition wherein the armature 56 is in its down-most position (as viewed in FIG. 1), an annular valving surface 156, formed generally circumferentially about passage or conduit means 106 and carried by armature means 56, sealingly abuts against a cooperating valve seating surface 158 of valve seat means 148.

A chamber 160 is formed generally between diaphragm means 46 and the flange (42) end of housing section means 16. A plurality of apertures or passages 162, formed in housing section 16, serve to communicate between chamber 160 and an area of relatively low reference or sump pressure, $P_s$. For purposes of disclosure, it may be assumed that the apparatus 10 and related cooperating support structure 118 are situated as to be generally surrounded by a relatively low reference, or sump, fluid pressure, $P_s$.

A first recess or groove 164 is formed circumferentially into the outer surface 114 of housing portion 112 while a second recess or groove 166 is formed circumferentially into inner passage 132. A plurality of generally radially extending passages or conduits 168 serve to complete communication between recesses or grooves 164 and 166. A relatively high pressure source or supply means 170, for supplying a fluid at a relatively high pressure, is in communication with annular groove or flow path 146 as via inner annular groove 166, conduit means 168, annular groove or recess 164 and conduit or passage means 172.

Similarly, an annular groove or recess 174 is formed generally peripherally into the outer surface 114 and is placed into communication with inner space or chamber means 136 as by a plurality of conduits or apertures 176. A control means 178 to be acted upon by fluid pressure, regulated or determined by valving means 124, is in communication with chamber 136, conduits or passages 176 and recess or flow ring 174 as via conduit or passage means 180.

A further annular groove or recess 182 is formed generally peripherally into the inner surface 130, of housing body 112, and placed into communication with said area of sump pressure as by conduit or passage means 184.

An end cap member 186, of generally disc-like configuration, is retained as within a bore formed in the lower end (as viewed in FIG. 1) of housing section or body 112. An aperture or passage 188, formed through end cap member 186, completes communication as between the fluid of low or sump pressure and conduit portion 132 axially beyond the outer end of valving body 127.

A resilient means such as, for example, a coiled compression spring 190 is situated in the control chamber means 136 and normally resiliently urges the spool valve 124 upwardly (as viewed in FIG. 1) or toward poppet valve seat member 148.

OPERATION OF THE INVENTION

Generally, the pressure regulating valving assembly 10, controls and/or determines fluid output pressure, in response to an electrical current, as by returning a portion of such fluid to, for example, sump. More particularly, an electrical signal, in which the magnitude of the current may be an indication of a sensed condition or an indication of the then desired operation of the control means 178, is applied to the field winding 28, as by terminals 30 and 32. This, in turn, creates a magnetic field with the path of the resulting flux being generally axially through pole piece 62, through flux ring or member 68 and its extension 67, through housing section 14, through flux member 44, generally axially along armature means 56 and back to the pole piece means. The calibrated spring means 88 resiliently resists the movement of armature means 56 away from valve seat member 148; however, generally, the greater the magnitude of the electrical current applied to the field coil means 28 the further will armature means 56 move, away from valve seat member 148, against the resilient resistance of spring means 88. The spring means 88 may be adjusted, via adjustment means 80, comprising separate members 81 and 83, as to apply an initial biasing force tending to maintain armature means 56 seated against valve seat member 148, thereby requiring a corresponding or related predetermined magnitude of electrical current to be first applied to field coil means 28 before the armature means 56 undergoes any opening movement with respect to valve seat member 148.

For ease of disclosure and understanding, the magnitude of the pressure of fluid provided by supply means 170 may be considered as being of constant relatively high magnitude, $P_1$. Assuming that armature means 56 is held against valve seat member 148, it can be seen that fluid at a supply pressure $P_1$ will flow into recess or groove 146, through conduit 144 and calibrated flow restriction 142, into passage or conduit means 138, into chamber or cavity 140 and into the chamber means 152. Some of such fluid flows into passages or conduits 154 and 106 with a small portion flowing through calibrated flow restriction means 108. As a consequence, the magnitude of fluid pressure in chamber 152, cavity or chamber 140, and conduits or passages 138 is at its maximum while the opposite end, valve body portion 127, is exposed to the low sump pressure $P_s$ via passage 188. This, in turn causes the spool valve member 124 to axially move a maximum distance, against the resistance of spring means 190, thereby assuredly terminating communication as between control chamber 136 and conduit means 184 while, simultaneously, opening communication as between recess means 166 and control chamber 136. The magnitude of the fluid pressure within control chamber 136 increases to its maximum value causing $P_c$ to approach the value of $P_1$.

The various clearances in the electromagnetic motor means 18 are filled with fluid. In order to continually assure that all air is purged, fluid is flowed through calibrated flow restriction means 108 and into the chamber within armature means 56. As previously indicated, the fluid eventually flows through, preferably, restriction means 95 in its outflow to sump. In the preferred embodiment, the restrictive effect of restriction means 95, to flow of fluid therethrough, is such as to preferably provide a rate of flow just slightly less than the rate of flow through the calibrated flow restrictive means 108.

When the magnitude of the electrical current applied to the field coil means 28 becomes sufficient to have the magnetic force of the generated flux overcome the pre-load of spring means 88, the armature 56 will start to move toward pole piece means 62 and as this occurs, the valving end surface 156 moves away from valve seating surface 158 of valve seat member 148. The magnitude of the electrical current necessary to thusly overcome the pre-load of spring 88 may be considered to be a "threshhold" value or magnitude of current. As should now be evident, the greater the magnitude of the current, the more armature means 56 moves away from valve seat member 148 and toward pole piece means 62. As the armature means 56 undergoes such motion, fluid flows out of passage means 154, between spaced surfaces 156 and 158 and into chamber 160 which is at or very close to sump pressure, $P_s$. Such fluid is then able to pass through conduit means 162-162. As a consequence, the magnitude of the pressure of fluid in chamber 152, chamber or cavity 140, and passages 138 decreases because of the restriction 142 and the relatively less restricted flow out of passage 154. This, in turn, enables the biasing resilient means 190 to move spool valve 124 upwardly (as viewed in FIG. 1) opening or further increasing communication as between control pressure chamber 136 and bypass-like passage means 182, 184 to sump, while communication as between annulus 166 and control chamber 136 is being reduced by the cylindrical surface 128.

That is, the valving assembly preferably employs a poppet orifice 154, in series with a fluid feed or supply restriction 142, to vary a pressure which acts directly on the spool valve 124. A regulating poppet valve 156 is employed to vary the magnitude of the fluid pressure at the poppet orifice means 154.

The poppet regulating valve 156 may, in fact, be positioned some small distance, for example 0.005 inch, away from the poppet valve seat surface 158 and, depending upon such distance, fluid flow is restricted across seating surface means 158 which, in turn, creates a back pressure at poppet orifice means 154 with such back pressure being transmitted to chamber 152, cavity or passage means 140 and passage means 138 of spool valve 124.

Fluid at a supply pressure, $P_1$, is fed as through conduit means 172, through annulus 164, conduit means 168, annulus 146, and, through calibrated restriction means 142 to spool valve 124 passage and/or chamber means 138 and 140. As the magnitude of the fluid pressure within 138, 140 and 152 thusly increases, the spool valve 124 experiences an increasing axially directed force which is in a direction opposed to by spring means 190.

When such a hydraulic force, axially against spool valve 124, becomes sufficient to overcome the force of spring 190, the spool valve 124 will begin to move axially away from poppet valve seat member 148 and toward end cap member 186 and exhaust port or passage 188. Such movement by spool valve 124, toward exhaust port 188, causes the supply port regulating surface 113, which comprises a portion of the outer cylindrical surface 128, to effectively decrease thereby allowing more fluid, at $P_1$, to flow out of annulus 166 and into control chamber 136. Simultaneously, as regulating surface 113 is thusly decreasing, the exhaust port regulating surface 115, which comprises a portion of the outer cylindrical surface 126, increases and increasingly restricts fluid flow out of control chamber 136 and into annulus 182 and exhaust passage or conduit means 184 to sump. The combination of the extra flow of fluid into control chamber 136 and the reduction of fluid flow out of control chamber 136 and into exhaust passage means 184 will create a magnitude of control pressure within control chamber 136 which will act upon the spool valve 124 and bring the spool valve 124 to a condition of rest with the various hydraulic forces and spring force being in equilibrium.

The difference in the diametrical dimensions of spool valve cylindrical portions 126 and 128 enables the spool valve 124 to achieve a state of equilibrium with a magnitude of fluid pressure in control chamber 136 greater than the then magnitude of fluid pressure in cavities or chambers 152, 140 and 138. It should be clear that although the spool valve 124 is depicted with valve portions having substantially different outer diametrical dimensions, the invention is not so limited.

Although only a preferred embodiment of the invention has been disclosed and described it is apparent that other embodiments and modifications of the invention are possible within the scope of the appended claims.

What is claimed is:

1. A pressure regulating assembly for regulating the pressure of a flowing fluid medium, comprising housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially generally between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, resilient means having first and second operative ends, wherein said first operative end is in operative engagement with said armature means, and spring seat means, wherein said second operative end is in operative engagement with said spring seat means, wherein said spring seat means comprises at least two spring seat members, and wherein one of said two spring seat members is articulatingly movable with respect to the other of said two spring seat members.

2. A pressure regulating assembly according to claim 1 wherein said at least two spring seat members comprise a threadably adjustable adjustment member and an intermediate member, wherein said adjustment member and said intermediate member are serially situated with respect to each other with said intermediate member being in operative engagement with said adjustment member, wherein said second operative end of said resilient means is in operative engagement with said intermediate member whereby said intermediate member is generally between said adjustment member and said resilient means, and wherein said intermediate member comprises said one of said two spring seat members.

3. A pressure regulating assembly for regulating the pressure of a flowing fluid medium, comprising housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially generally between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, resilient means having first and second operative ends, wherein said first operative end is in operative engagement with said armature means, and spring seat means, wherein said second operative end is in operative engagement with said spring seat means, wherein said spring seat means comprises at least two spring seat members, wherein said at least two spring seat members comprise a threadably adjustable adjustment member and an intermediate member, wherein said adjustment member and said intermediate member are serially situated with respect to each other with said intermediate member being in operative engagement with said adjustment member, wherein said second operative end of said resilient means is in operative engagement with said intermediate member whereby said intermediate member is generally between said adjustment member and said resilient means, wherein said adjustment member comprises first and second oppositely situated axial ends, wherein said intermediate member comprises third and fourth oppositely situated axial ends, wherein said resilient means comprises coiled compression spring means, wherein said second operative end of said resilient means is in operative engagement with said fourth axial end, wherein said second and third axial ends are in operative abutting engagement with each other, and wherein said second axial end comprises generally convex abutment surface means.

4. A pressure regulating assembly for regulating the pressure of a flowing fluid medium, comprising housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially generally between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, resilient means having first and second operative ends, wherein said first operative end is in operative engagement with said armature means, spring seat means, wherein said second operative end is in operative engagement with said spring seat means, wherein said spring seat means comprises at least two spring seat members, wherein said armature means comprises a generally tubular cylindrical armature member having a generally centrally situated axially extending cylindrical passage and an axially extending outer cylindrical surface, wherein said resilient means is carried generally within said centrally situated axially extending cylindrical passage, wherein one of said two spring seat members is at least partly situated in said centrally situated axially extending cylindrical passage, and wherein said one of said two spring seat members is articulatingly movable with respect to the other of said two spring seat members.

5. A pressure regulating assembly for regulating the pressure of a flowing fluid medium, comprising housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially generally between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, resilient means having first and second operative ends, wherein said first operative end is in operative engagement with said armature means, and spring seat means, wherein said second operative end is in operative engagement with said spring seat means, wherein said spring seat means comprises at least two spring seat members, wherein said armature means comprises a generally tubular cylindrical armature member having a generally centrally situated axially extending cylindrical passage and an axially extending outer cylindrical surface, wherein said resilient means is carried generally within said centrally situated axially extending cylindrical passage, wherein one of said two spring seat members is at least partly situated in said centrally situated axially extending cylindrical passage, wherein said at least two spring seat members comprise a threadably adjustable adjustment member and an intermediate member, wherein said one of said two spring seat members comprises said intermediate member, wherein said resilient means comprises coiled compression spring means, wherein said adjustment member is physically in series with said intermediate member and said spring means, wherein said adjustment member comprises first and second oppositely situated axial ends, wherein said intermediate member comprises third and fourth oppositely situated axial ends, wherein said second operative end of said resilient means is in operative engagement with said fourth axial end, wherein said second and third axial ends are in operative abutting engagement with each other, and wherein said second axial end comprises generally convex abutment surface means.

6. A pressure regulating assembly according to claim 5 and further comprising fluid out-flow passage means formed in said adjustment member, wherein said fluid out-flow passage means communicates with an area outwardly of said housing means and communicates with said fluid medium as flows out of said fluid-flow passage means.

7. A pressure regulating assembly according to claim 6 wherein said out-flow passage means comprises fluid out-flow restriction means.

8. A pressure regulating assembly according to claim 7 wherein said adjustment member is threadably connected to said pole piece means.

9. A pressure regulating assembly for regulating the pressure of a flowing fluid medium, comprising housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially generally between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, resilient means having first and second operative ends, wherein said first operative end is in operative engagement with said armature means, spring seat means, wherein said second operative end is in operative engagement with said spring seat means, wherein said spring seat means comprises at least two spring seat members, and further comprising first magnetic flux conducting means situated in said first housing portion and at a first axial end of said electrical field coil means as to be generally contained between said first housing portion and said first axial end of said electrical field coil means, second magnetic flux conducting means situated in said first housing portion and at a second axial end of said electrical field coil means opposite to said first axial end of said electrical field coil means and as to be generally contained between said first housing portion and said second axial end of said electrical field coil means, and tubular cylindrical sleeve means, said sleeve means being at least partly received by said second magnetic flux conducting means and effective for axially abutting against said first and second magnetic flux conducting means thereby preventing said first and second magnetic flux conducting means being positioned with respect to each other a distance less than that determined by the axial abutting of said sleeve means.

10. A pressure regulating assembly for regulating the pressure of a flowing fluid medium, comprising housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially generally between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, resilient means having first and second operative ends, wherein said first operative end is in operative engagement with said armature means, spring seat means, wherein said second operative end is in operative engagement with said spring seat means, wherein said spring seat means comprises at least two spring seat members, and further comprising bobbin means carrying said electrical field coil means, wherein said bobbin means comprises a generally tubular cylindrical bobbin portion generally radially inwardly of said electrical field coil means, and further comprising sleeve means, said sleeve means being axially contained in said first housing portion and situated radially inwardly of and in said generally tubular cylindrical bobbin portion, and wherein said armature means is slidably movable in and with respect to said generally tubular cylindrical bobbin portion.

11. A pressure regulating assembly according to claim 10 and further comprising magnetic flux conducting means wherein said magnetic flux conducting means is of ring-like configuration comprising a generally centrally located cylindrical passage, wherein said sleeve means is situated radially inwardly of and against both said generally tubular cylindrical bobbin portion and said centrally located cylindrical passage, and annular abutment means carried by said sleeve means, said annular abutment means engaging said magnetic flux conducting means to limit relative axial movement of said sleeve means and said magnetic flux conducting means.

12. A pressure regulating assembly for regulating the pressure of a flowing fluid medium, comprises housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially generally between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, resilient means having first and second operative ends, wherein said first operative end is in operative engagement with said armature means, and spring seat means, wherein said second operative end is in operative engagement with said spring seat means, wherein said spring seat means comprises at least two spring seat members, wherein said second housing portion comprises flange-like connecting means, and further comprising first magnetic flux conducting means situated in said first housing portion and at a first axial end of said electrical field coil means as to be generally contained between said first housing portion and said first axial end of said electrical field coil means, second magnetic flux conducting means situated in said first housing portion and at a second axial end of said electrical field coil means opposite to said first axial end of said electrical field coil means, wherein said flange-like connecting means is situated in said first housing portion as to be between said second magnetic flux conducting means and said first housing portion, and tubular cylindrical sleeve means, said sleeve means being at least partly received by said second magnetic flux conducting means and effective for axially abutting against said first and second magnetic flux conducting means thereby preventing said first and second magnetic flux conducting means to be positioned with respect to each other a distance less than that determined by the axial abutting of said sleeve means.

13. A pressure regulating assembly according to claim 12 wherein said at least two spring seat members comprise a threadably adjustable adjustment member and an intermediate member, wherein said adjustment member and said intermediate member are serially situated with respect to each other with said intermediate member being in operative engagement with said adjustment member, and wherein said second operative end of said resilient means is in operative engagement with said intermediate member whereby said intermediate member is generally between said adjustment member and said resilient means.

14. A pressure regulating assembly according to claim 13 wherein said adjustment member comprises first and second oppositely situated axial ends, wherein said intermediate member comprises third and fourth oppositely situated axial ends, wherein said resilient means comprises coiled compression spring means, wherein said second operative end of said resilient means is in operative engagement with said fourth axial end, wherein said second and third axial ends are in operative abutting engagement with each other, and wherein said second axial end comprises generally convex abutment surface means.

15. A pressure regulating assembly according to claim 12 wherein said armature means comprises a generally tubular cylindrical armature member having a generally centrally situated axially extending cylindrical passage and an axially extending outer cylindrical surface, wherein said resilient means is carried generally within said centrally situated axially extending cylindrical passage, and wherein one of said two spring seat members is at least partly situated in said centrally situated axially extending cylindrical passage.

16. A pressure regulating assembly according to claim 15 wherein said at least two spring seat members comprise a threadably adjustable adjustment member and an intermediate member, wherein said one of said two spring seat members comprises said intermediate member, wherein said resilient means comprises coiled compression spring means, wherein said adjustment member is physically in series with said intermediate member and said spring means, wherein said adjustment member comprises first and second oppositely situated axial ends, wherein said intermediate member comprises third and fourth oppositely situated axial ends, wherein said second operative end of said resilient means is in operative engagement with said fourth axial end, wherein said second and third axial ends are in operative abutting engagement with each other, and wherein said second axial end comprises generally convex abutment surface means.

17. A pressure regulating assembly according to claim 16 and further comprising fluid out-flow passage means formed in said adjustment member, wherein said fluid out-flow passage means communicates with an area outwardly of said housing means and communicates with said fluid medium as flows out of said fluid-flow passage means.

18. A pressure regulating assembly according to claim 17 wherein said out-flow passage means comprises fluid out-flow restriction means.

19. A pressure regulating assembly according to claim 18 wherein said adjustment member is threadably connected to said pole piece means.

20. A pressure regulating assembly for regulating the pressure of a flowing fluid medium, comprises housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially generally between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular camber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, resilient means having first and second operative ends, wherein said first operative end is in operative engagement with said armature means, and spring seat means, wherein said second operative end is in operative engagement with said spring seat means, wherein said spring seat means comprises at least two spring seat members, wherein said at least two spring seat members comprise a threadably adjustable adjustment member and an intermediate member, wherein said adjustment member comprises an end surface of generally convex configuration, and wherein said adjustment member and said intermediate member are serially situated with respect to each other with said intermediate member being in operative engagement with said generally convex end surface.

21. A pressure regulating assembly for regulating the pressure of a flowing fluid medium, comprising housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially generally between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first.valving portion reduces its restrictive effect to flow of said fluid medium through said first fluid inlet passage means and into said annular chamber and out of said second fluid outlet passage means to associated structure to be acted upon by said fluid medium, resilient means having first and second operative ends, wherein said first operative end is in operative engagement with said armature means, spring seat means, wherein said second operative end is in operative engagement with said spring seat means, and further comprising first magnetic flux conducting means situated in said first housing portion and at a first axial end of said electrical field coil means as to be generally contained between said first housing portion and said first axial end of said electrical field coil means, second magnetic flux conducting means situated in said first housing portion and at a second axial end of said electrical field coil means opposite to said first axial end of said electrical field coil means and as to be generally contained between said first housing portion and said second axial end of said electrical field coil means, and tubular cylindrical sleeve means, said sleeve means being at least partly received by said second magnetic flux conducting means and effective for axially abutting against said first and second magnetic flux conducting means thereby preventing said first and second magnetic flux conducting means being positioned with respect to each other a distance less than that determined by the axial abutting of said sleeve means.

* * * * *